United States Patent
Hagstroem et al.

(10) Patent No.: US 12,472,088 B2
(45) Date of Patent: Nov. 18, 2025

(54) VALVE FOR A UROSTOMY APPLIANCE

(71) Applicant: Coloplast A/S, Humlebaek (DK)

(72) Inventors: Christen Hagstroem, Glostrup (DK); Jakob Bak Jaepelt, Kgs. Lyngby (DK)

(73) Assignee: Coloplast A/S, Humlebaek (DK)

( * ) Notice: Subject to any disclaimer, the term of this patent is extended or adjusted under 35 U.S.C. 154(b) by 319 days.

(21) Appl. No.: 18/267,791

(22) PCT Filed: Dec. 21, 2021

(86) PCT No.: PCT/DK2021/050379
§ 371 (c)(1),
(2) Date: Jun. 16, 2023

(87) PCT Pub. No.: WO2022/135644
PCT Pub. Date: Jun. 30, 2022

(65) Prior Publication Data
US 2024/0091046 A1    Mar. 21, 2024

(30) Foreign Application Priority Data
Dec. 22, 2020    (DK) .......................... PA 2020 70867

(51) Int. Cl.
*A61F 5/44* (2006.01)
*A61F 5/443* (2006.01)
*A61F 5/445* (2006.01)

(52) U.S. Cl.
CPC ............ *A61F 5/4405* (2013.01); *A61F 5/445* (2013.01)

(58) Field of Classification Search
CPC ......... A61F 5/4405; A61F 5/445; A61F 5/443
See application file for complete search history.

(56) References Cited

U.S. PATENT DOCUMENTS 3,664,634 A * 5/1972 Guertin et al. ......... F16L 37/36
251/333
4,055,179 A * 10/1977 Manschot ............. A61F 5/4405
604/335

(Continued)

FOREIGN PATENT DOCUMENTS

AU    541943 B2    1/1985
EP    0185809 A1    7/1986

(Continued)

*Primary Examiner* — Guy K Townsend
(74) *Attorney, Agent, or Firm* — Coloplast Corp., Coloplast A/S; Nick Baumann

(57) ABSTRACT

A valve (10) for draining fluid from a urostomy pouch (5), where the valve comprises a first valve portion (20) comprising a head portion (24), a stem (6), an inlet (15), a first bore (22), at least one outlet opening (23) and a distal end closure (25), and a second valve portion (30) comprising a sleeve (7), a second bore (32) and a valve outlet (33), the first bore (22) and the second bore (32) form a channel to transport fluid from the inlet (15) to the valve outlet (33), the sleeve (7) encircles the stem (6) and is adapted to close the channel to prevent drainage of fluid, the distal end closure (25) of the first valve portion (20) is adapted to close off the valve outlet (33) of the second valve portion (30), wherein the valve comprises one or more arms (36), the one or more arms extending between a distal end (41) and a proximal end (42), the one or more arms (36) having the distal end (41) connected to the sleeve (7) and the proximal end (42) coupled to the head portion (24), wherein the one or more arms (36) is arranged in a distance from the sleeve (7) forming a gap between the one or more arms (36) and the sleeve (7), wherein the one or more arms (36) is adapted to be moved towards the sleeve (7) into the gap, which displaces the sleeve (7) away from the head portion (24) of the first valve portion to open the channel and allow drainage (Continued)

of fluid through the valve (10), as the distal end closure (25) is simultaneously displaced into the second bore (32).

16 Claims, 6 Drawing Sheets

(56) References Cited

U.S. PATENT DOCUMENTS

| | | | | |
|---|---|---|---|---|
| 4,280,498 | A * | 7/1981 | Jensen | A61F 5/4405 |
| | | | | 604/323 |
| D300,361 | S * | 3/1989 | Tokarz | A61F 5/4405 |
| | | | | D24/129 |
| 5,135,199 | A | 8/1992 | Cross et al. | |
| 5,156,603 | A | 10/1992 | Olsen | |
| 6,032,926 | A * | 3/2000 | Fuchs | A61J 1/10 |
| | | | | 251/149.4 |
| 6,132,408 | A * | 10/2000 | Lutz | A61F 5/4407 |
| | | | | 604/335 |
| 6,913,244 | B1 | 7/2005 | Atkinson et al. | |
| 7,147,004 | B1 * | 12/2006 | Hartman | F16L 37/18 |
| | | | | 251/149.6 |
| 8,512,313 | B2 * | 8/2013 | Atkinson | F16K 27/041 |
| | | | | 604/328 |
| 8,550,429 | B2 * | 10/2013 | Auston | F16L 37/44 |
| | | | | 251/149.9 |
| 8,882,732 | B2 * | 11/2014 | March | A61F 5/445 |
| | | | | 604/332 |
| 9,333,110 | B2 * | 5/2016 | March | A61F 5/445 |
| 10,251,770 | B2 * | 4/2019 | Chang | A61F 5/445 |
| 2011/0106060 | A1 * | 5/2011 | Atkinson | F16K 27/041 |
| | | | | 251/324 |
| 2012/0130329 | A1 * | 5/2012 | March | F16K 3/24 |
| | | | | 604/332 |
| 2013/0338616 | A1 * | 12/2013 | Galindo | A61F 5/4405 |
| | | | | 604/335 |
| 2015/0025483 | A1 * | 1/2015 | March | A61F 5/4405 |
| | | | | 604/318 |
| 2015/0190272 | A1 * | 7/2015 | Chang | A61F 5/445 |
| | | | | 604/335 |
| 2017/0297782 | A1 | 10/2017 | Wanejko | |
| 2018/0098877 | A1 | 4/2018 | Pierson | |
| 2018/0100598 | A1 * | 4/2018 | Pierson | A61F 5/4405 |
| 2021/0022911 | A1 * | 1/2021 | Scalise | A61F 5/4407 |
| 2024/0058158 | A1 * | 2/2024 | Hagstroem | A61F 5/4405 |

FOREIGN PATENT DOCUMENTS

| | | |
|---|---|---|
| EP | 1800632 A1 | 6/2007 |
| GB | 2082288 A | 3/1982 |
| TW | 201608966 A | 3/2016 |
| WO | 1982003006 A1 | 9/1982 |
| WO | 2020174218 A1 | 9/2020 |
| WO | 2020174220 A1 | 9/2020 |

\* cited by examiner

VALVE FOR A UROSTOMY APPLIANCE

The invention relates to a valve for a urostomy appliance.

BRIEF DESCRIPTION OF THE DRAWING

The accompanying drawings are included to provide a further understanding of embodiments and are incorporated into and a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
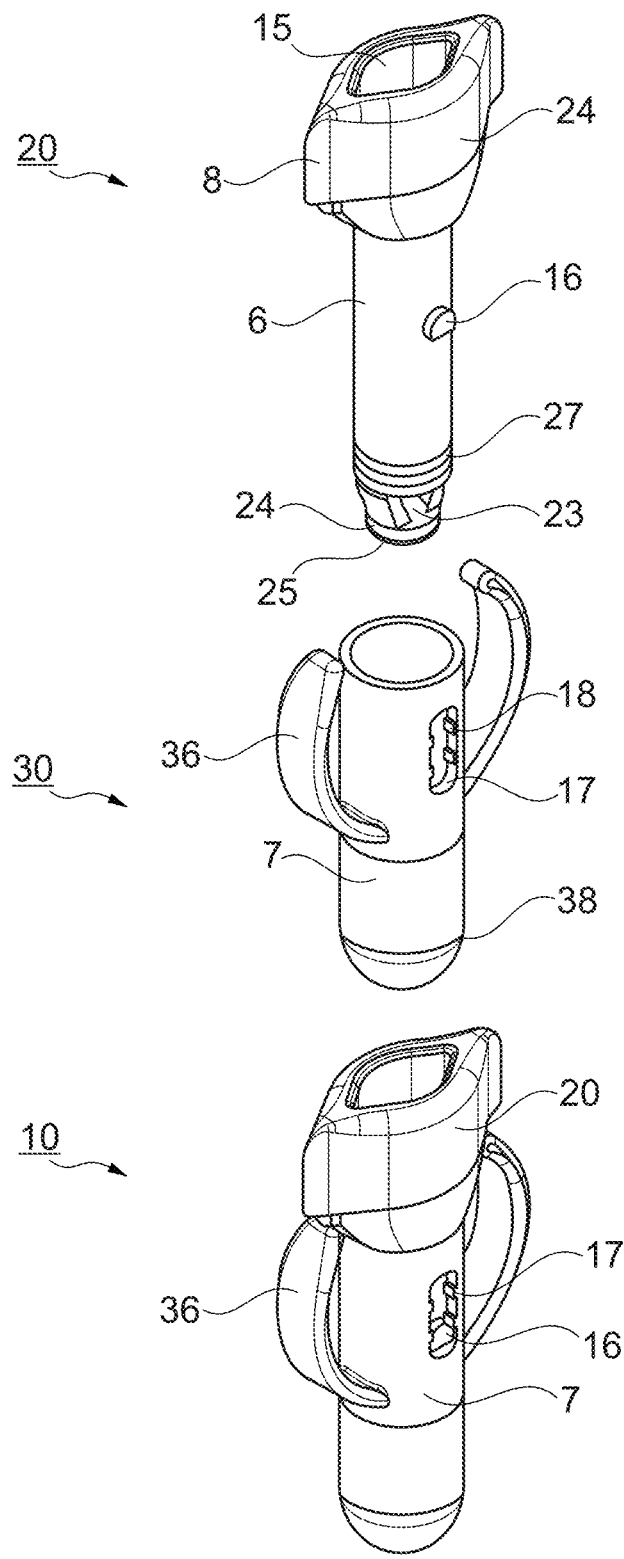
FIG. 1 illustrates in a perspective view a valve for a urostomy appliance.

Embodiments, and features of the various exemplary embodiments described in this application, may be combined with each other ("mixed and matched"), unless specifically noted otherwise.

A urostomy appliance is typically used to collect urine from a urostomy connecting the urine system in the body with the abdominal surface of the user. The appliance is directly or indirectly adhered to the skin of the user around the urostomy. Urostomy appliances includes a collecting pouch for collecting the urine. The pouch is typically provided with an outlet including a valve at the bottom of it making it possible for the user to drain the urine into a suitable place during the day—e.g. a toilet. At night, a tube for a collecting bag may be connected to the valve.

However, there is still a need for a more convenient solution for the user.

Embodiments relate to a valve for draining fluid from a urostomy pouch, wherein the valve comprises a first valve portion comprising a head portion, a stem, an inlet, a first bore, at least one outlet opening and a distal end closure, and a second valve portion comprising a sleeve, a second bore and a valve outlet, the first bore and the second bore form a channel to transport fluid from the inlet to the valve outlet, the sleeve encircles the stem and is adapted to close the channel to prevent drainage of fluid, the distal end closure of the first valve portion is adapted to close off the valve outlet of the second valve portion, wherein the valve comprises one or more arms, the one or more arms extending between a distal end and a proximal end, the one or more arms having the distal end connected to the sleeve and the proximal end coupled to the head portion, wherein the one or more arms are arranged in a distance from the sleeve forming a gap between the one or more arms and the sleeve, wherein the one or more arms are adapted to be moved towards the sleeve into the gap, which displaces the sleeve away from the head portion of the first valve portion to open the channel and allow drainage of fluid through the valve, as the distal end closure is simultaneously moved into the second bore.

A valve as described above has the advantage that it is easy for a user to drain their urostomy pouch for fluid. The user may simply press or squeeze the one or more arms to the effect that the valve outlet is opened. As the one or more arms are moved towards the sleeve into the gap, the sleeve is moved away from the head portion of valve and the distal end closure simultaneously is moved into the second bore to the effect that the channel allows drainage of fluid through the valve. The user does not need to reposition the hands during opening of the valve. Thus, the valve is easy to use and the user is in control of the fluid flowing through the valve. Additionally, the valve operates so as to avoid any undesirable dripping or spillage.

Generally, the valve may be a urostomy valve, such as a urostomy pouch valve.

Whenever referring to the proximal end of the valve, the referral is to the end closest to the urostomy collecting pouch. Likewise, whenever referring to the distal end of the valve, the referral is to the end furthest away from the collecting pouch.

Figure 2:
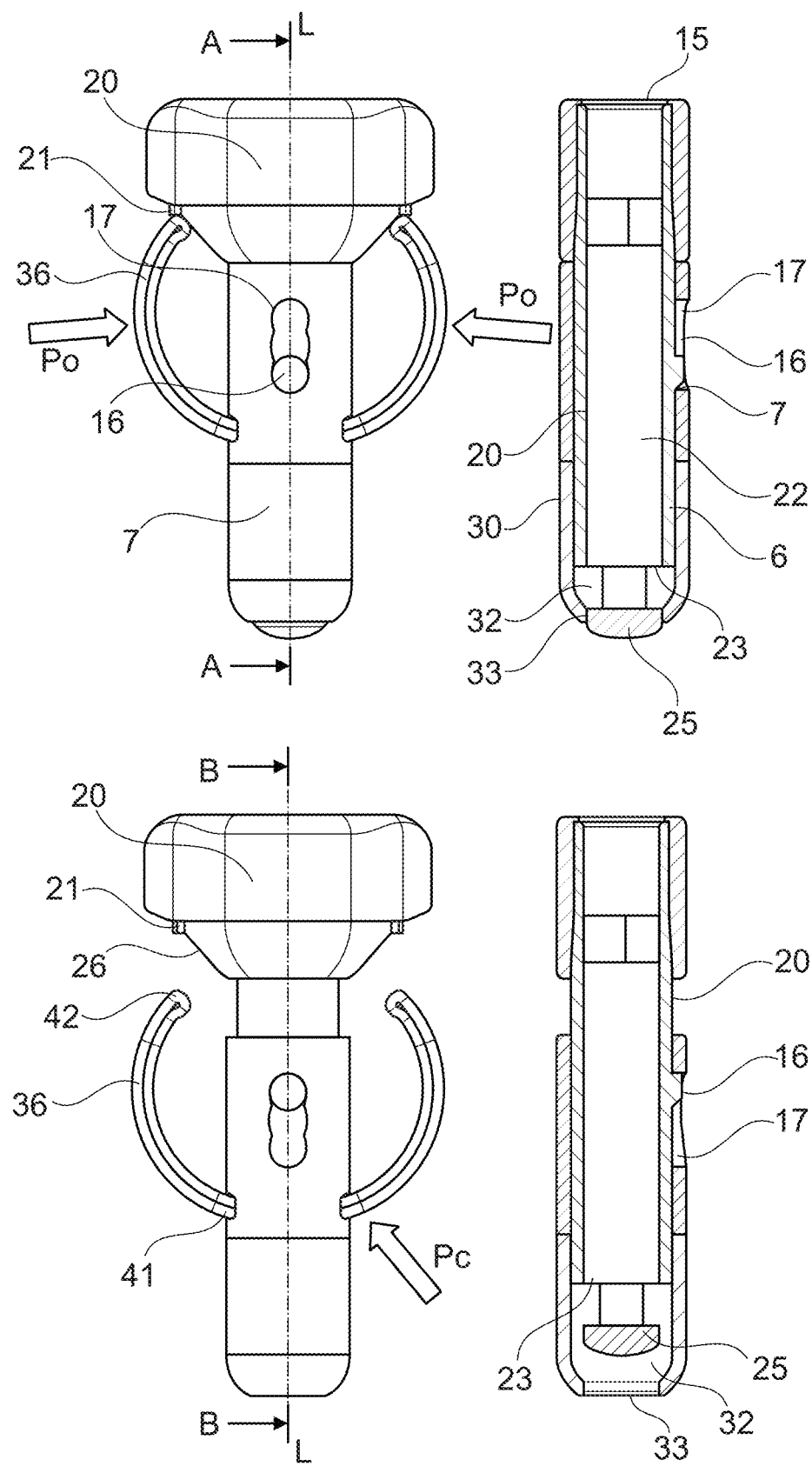
FIG. 2 illustrates two side views and two detailed cross-sectional views of a valve in a closed configuration and an opened.

The axial direction, the longitudinal direction and the central longitudinal axis (L) of the valve extends from the inlet to the valve outlet. The radial direction is transverse the axial direction. The central longitudinal axis (L) is the axial axis passing through the centre of the valve in the longitudinal direction (as illustrated in FIG. 2).

A collecting pouch of a urostomy appliance usually comprises a front wall on the distal side and a rear wall on the proximal side. The walls are made of gas and liquid impermeable foil material (for example of polyethylene (PE), polyvinyl-chloride (PVC) or ethylene-vinyl-acetate (EVA)) that is welded around the edges or the rim so as to form a pouch defining a collection chamber. The pouch includes a valve for leading out urine at the bottom of the pouch. The inlet opening is provided in the rear wall and placed in the upper part of the collecting pouch so that when a user stands up, the inlet opening will be above the midline of the collecting pouch. This leaves a larger collecting volume below the inlet opening. Thus, the top of the collecting pouch is defined as the part closest to the inlet opening, and the bottom is defined as the opposite part. Urostomy pouches are typically provided with an outlet at the bottom of the pouch that in its simplest form is an outlet closed by a detachable closure.

The parts of the valve may be made of e.g. a polyolefin material such as polyethylene. The sealing means may be made of LDPE.

In embodiments, the proximal end of the one or more arms are removably coupled to the head portion.

In embodiments, the head portion comprises one or more contact faces and the proximal end of the one or more arms extends towards the one or more contact faces, the one or more arms and the one or more contact faces being adapted to cooperate to displace the sleeve away from the head portion, when the arms are moved towards the sleeve into the gap.

In embodiments, the second valve portion comprises two oppositely positioned arms. Hereby, a stable and sturdy rotatable valve structure is achieved. In embodiments, the head portion comprises two contact faces.

In embodiments, the one or more arms comprise a curved segment and/or a linear segment. The one or more arms may extend from the sleeve to the head portion in a shape such that the proximal ends of the arms extend towards the one or more contact faces of the head portion.

The one or more arms may extend radially from the sleeve for providing a grip portion allowing a user to close the valve by a force applied on the distal end of the one or more arms. The one or more arms may have a circular segment shape. Arms may have a linear segment, a curved segment or/and circular segment shape.

In embodiments, the one or more arms are resilient, such that the one or more arms may be squeezed by finger force of a user allowing the one or more arms to be stretched longitudinally and flex back to shape after end of squeezing. The shape of the one or more arms may be changed temporarily during the squeezing of a user, afterwards the one or more arms retains the shape as in an un-squeezed configuration, when the valve and the arms are not influenced by any forces applied by the user.

In embodiments, the one or more contact faces each have a tapered surface tapering in distal direction. Hereby, the proximal end of the one or more arms may slide along the tapered surface of the one or more contact faces and thereby increase the longitudinal displacement of the two valve portions due to the extent of the tapered surface.

In embodiments, the two arms are arranged symmetrically along the central longitudinal axis (L).

In embodiments, the one or more arms comprises a semi-circular ring shape having a diameter of 15-35 mm, such as 25 mm, when in an un-squeezed configuration.

In embodiments, the distal end closure of the first valve comprises a cylindrical shape forming a stem plug for the circular shaped valve outlet. The sleeve may be made of resilient material to form a seal around the stem plug.

It is convenient for some users that the movement in longitudinal direction of the valve portions is initiated before the valve outlet is opened and fluid starts flowing. It allows a user to initiate the opening of the valve slowly and to feel in control of the valve before fluid starts to flow. Thus, the user is in full control of handling the valve and the flow rate.

The first valve portion may comprise one or more ring-shaped seals on the stem. The one or more ring-shaped seals may be positioned on the stem between a lock protrusion and the one or more outlet openings.

The one or more outlet openings of the first valve portion may be arranged at the distal end of the stem. The one or more radial-facing and/or axial-facing outlet openings allows fluid to flow from the first bore into the second bore.

In embodiments, the first valve portion comprises a lock protrusion extending in a radial direction. The stem may comprise a lock protrusion extending outwardly in a radial direction. The lock protrusion may be arranged between the head portion and the one or more outlet openings on the stem of the first valve portion. The lock protrusion may comprise a substantially cylindrical shaped base having a cut off at the distal part of the lock protrusion to provide a radially outward half-moon-shaped face. The lock protrusion may have an icon, a letter or a color on the face.

In embodiments, the lock protrusion has a distal face comprising a half-moon-shaped face. The lock protrusion may extend radially outwards. Hereby, after manufacturing of the first and second valve portions, they may be assembled to form a valve. The tapered protrusion allows the stem to be pressed into position inside the sleeve.

In embodiments, the second valve portion comprises an elongated slot extending in the longitudinal direction, the elongated slot being adapted for accommodating the lock protrusion. The elongated slot is aligned with the position of the lock protrusion and supports the position of the sleeve in relation to the first valve portion. Hereby, the lock protrusion and the elongated slot provide a holding force that may be overcome by a force provided by a user's hands.

The elongated slot may comprise an eight-shaped slot having two minor tangentially extending flanges for providing two positions for the lock protrusion in the elongated slot.

In embodiments, the elongated slot comprises toothed sidewalls for providing a holding force for the lock protrusion to be positioned in different positions along the elongated slot. Hereby, the elongated slot provides several positions for the lock protrusion along the elongated slot, as the toothed sidewalls of the elongated slot provides a number of minor tangentially extending flanges.

In embodiments, the valve is adapted to perform a maximum displacement in a longitudinal direction between the head portion and the sleeve of 4-10 mm, such as 5.2 mm.

Generally, the valve may comprise a total length from the inlet to the valve outlet of 30-55 mm, such as 38-47 mm. It may be a convenient valve size for most users, as the valve is relatively small, but still big enough to handle.

The second valve portion may comprise a shape having a size in cross-sectional direction of 6-35 mm, such as 10-25 mm.

In embodiments, the valve is adapted to perform a maximum displacement in a longitudinal direction between the head portion and the sleeve of 4-10 mm, such as 5 mm. Thus, the maximum distance between the head portion and the sleeve may be 5.2 mm.

The second valve portion may comprise a ring-shaped sealing groove on the outer surface for connection with a urostomy appliance, such as a tube for a night collecting bag.

Embodiments relate to a urostomy pouch valve for draining fluid from a urostomy pouch, wherein the valve comprises a first valve portion comprising a head portion, a stem, an inlet, a first bore, at least one outlet opening and a distal end closure and a second valve portion comprising a sleeve, a second bore and a valve outlet; the first bore and the second bore forming a channel to transport fluid from the inlet to the valve outlet, and the distal end closure of the first valve portion is adapted to close off the valve outlet of the second valve portion, the sleeve encircles the stem and is adapted to close the channel to prevent draining fluid out of the urostomy pouch, wherein the valve comprises one or more arms, the one or more arms extending between a distal end and a proximal end, the one or more arms having the distal end connected to the sleeve and the proximal end coupled to the head portion, wherein the one or more arms are arranged in a distance from the sleeve forming a gap between the one or more arms and the sleeve, wherein the one or more arms are adapted to be moved towards the sleeve into the gap, which displaces the sleeve away from the head portion of the first valve portion to open the channel to allow drainage of fluid from the urostomy pouch through the valve as the distal end closure simultaneously is moved into the second bore.

The means for attaching the urostomy appliance to the user may include a base plate for attaching to the skin of the user and a wafer on the urostomy appliance for coupling the appliance to the base plate. Alternatively, the appliance may include a wafer that is adapted for directly adhering it to the skin of the user.

DETAILED DESCRIPTION OF THE DRAWING

In the following detailed description, reference is made to the accompanying drawings, which form a part hereof, and in which is shown by way of illustration specific embodiments in which the invention may be practiced. Because components of embodiments can be positioned in different orientations, the directional terminology is used for purposes of illustration and is in no way limiting. It is to be understood that other embodiments may be utilized, and structural or logical changes may be made without departing from the scope of the present invention. Therefore, the following detailed description is not to be taken in a limiting sense, and the scope of the present invention is defined by the appended claims.

FIG. 1 illustrates in a perspective view a valve for a urostomy appliance.

The valve 10 comprises a first valve portion 20 and a second valve portion 30. The first valve portion 20 comprises a head portion 24, a stem 6, an inlet 15, two radial-facing outlet openings 23, a distal end closure 25 and two sealing rings 27. The stem comprises a radially extending lock protrusion 16 cooperating with an elongated slot 17 on the second valve portion 30. The second valve portion 30 comprises a sleeve 7 and two oppositely positioned arms 36.

The elongated slot 17 comprises toothed sidewalls 18. The minor tangentially extending flanges provide a holding force for keeping the lock protrusion 16 in a specific position to avoid unintentional movement in the longitudinal direction. The holding force provided by the lock protrusion 16 and the elongated slot 17 can be overcome by finger force of a user.

The second valve portion 30 comprises a ring-shaped sealing groove 38 on the outer surface allowing for connection with accessories for a urostomy appliance, such as a tube for a night collecting bag.

FIG. 2 illustrates two side views and two detailed cross-sectional views of a valve in a closed configuration and an opened.

The first valve portion comprises a head portion 24, an inlet 15, a stem 6, a first elongated bore 22, two radially facing outlet opening 23 and a distal end closure 25. The head portion 24 comprises a flange forming a grip portion 8. The second valve portion 30 comprises a sleeve 7, a second bore 32 and a valve outlet 33.

The second valve portion 30 encircles the first valve portion 20 and the first elongated bore 22 and the second elongated bore 32 are fluidly connected connecting the inlet 15 and the valve outlet 33.

The sleeve 7 of the second valve portion 30 comprises two oppositely positioned arms 36. The two arms 36 extend radially and comprise a curved shape. The distal end 41 of the two arms 36 extend radially away from the sleeve 7 of the second valve portion. The proximal end 42 of the arms extend towards the two tapered contact faces 26 on the head portion 24 of the first valve portion 20.

The two arms 36 extend from the second valve portion 30 and curve towards the contact faces 26 on the head portion of first valve portion 20. The two arms have circular segment shape.

The proximal ends of the two arms abut the contact faces 26 and by pressure of a user in the transverse direction on the two arms 36, as illustrated by arrows Po, cause the valve outlet to open. The pressure causes a displacement in longitudinal direction of the sleeve 7 relative to the head portion 24 as well as the distal end closure 25 of the first valve portion being retracted from the valve outlet 33 and into the second bore 32 formed in the second valve portion.

The arms 36 extend from the sleeve in a position between a distal end and a proximal end. The arms are arranged in a distance from the sleeve in radial direction forming a gap between the one or more arms and the sleeve. When the arms are moved, radially inwards, towards the sleeve into the gap, the sleeve is moved away from the head portion of the first valve portion in longitudinal direction. Hereby, the channel is opened and drainage of fluid through the valve is possible, as the distal end closure is simultaneously displaced into the second bore.

The movement of the first and second valve portion also causes the lock protrusion 16 to pass along the elongated slot 17 comprising the toothed sidewalls 18, when the holding force of the lock protrusion 16 and the elongated slot 17 is exceeded by the finger force of a user. The movement of the first and second valve portion is stopped when the lock protrusion 16 is positioned adjacent the distal or the proximal end walls.

FIG. 2 shows that the distal end closure 25 is positioned in the bore 32 of the second valve portion, when the valve is in the open configuration.

Figure 3:
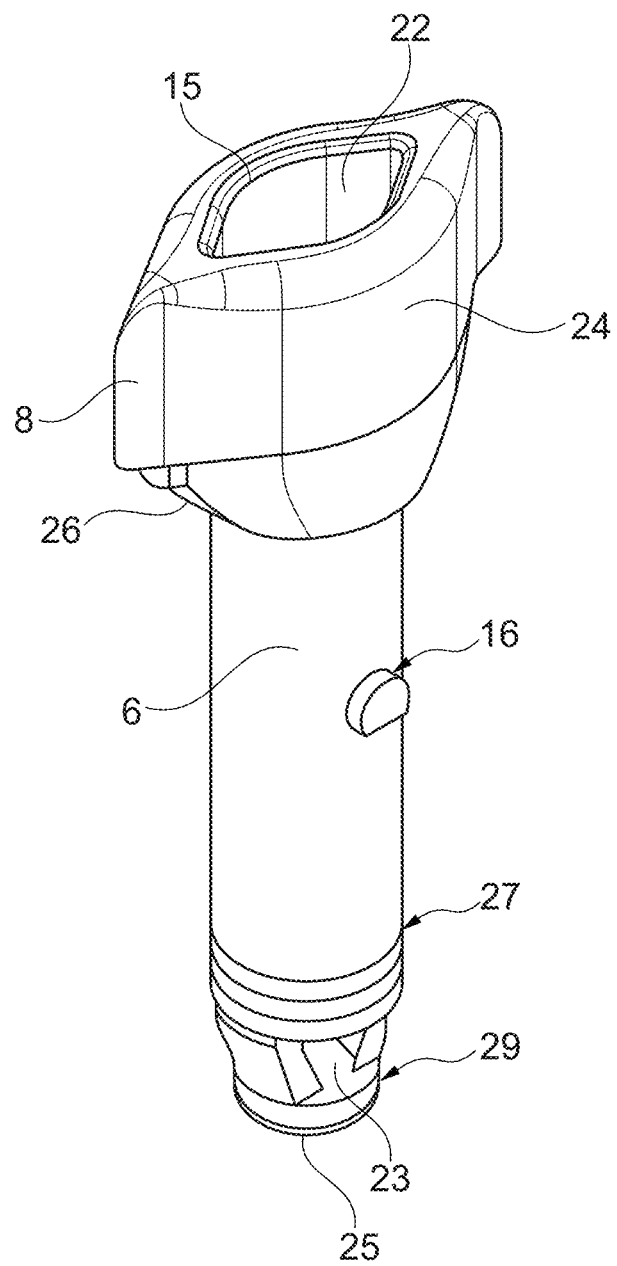
FIG. 3 illustrates in a perspective view a first valve portion having a head portion and a stem.

FIG. 3 illustrates the first valve portion comprising the head portion 24, the inlet 15, the stem 6, the bore 22 and the tapered contact face 26 on a distal part of the head portion 24. At the distal end of the first valve portion, two sealing rings 27 are positioned above proximately two outlet openings 23. The two outlet openings 23 face radially outwards. The distal end closure 25 comprises a cylindrical shape forming a stem plug 29 for the circular shaped valve outlet. The lock protrusion 16 is arranged approximately on the middle of the stem 7 of the first valve portion 20 and extends radially from the stem.

The stem 6 comprises one or more ring-shaped seals for fluidly sealing between the stem and the sleeve 7.

Figure 4:
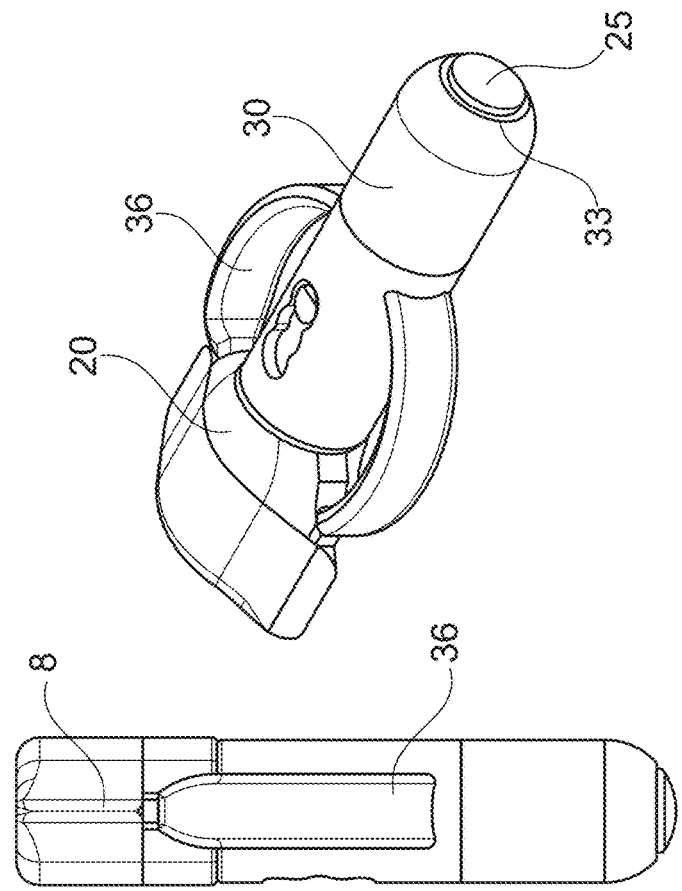
FIG. 4 illustrates a top view, two side views and a perspective view of a valve in a closed configuration.
Figure 4:
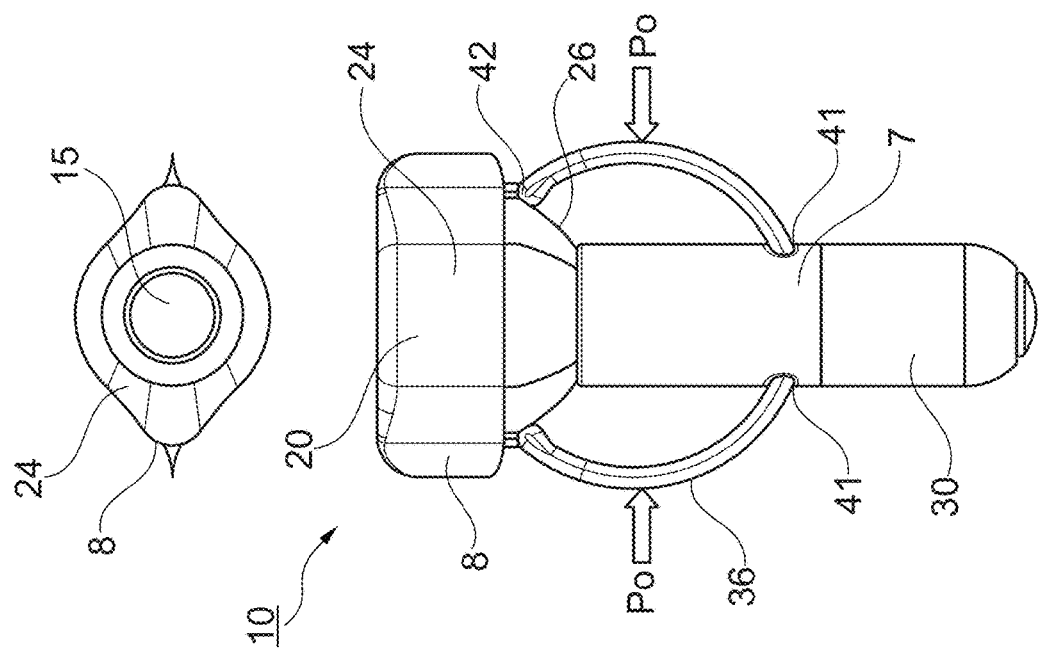

FIG. 4 illustrates a top view, two side views and a perspective view of a valve in a closed configuration.

The arms 36 comprise a semi-circular ring shape. They are arranged on the lateral side of the sleeve spaced apart by the sleeve having a width of 10 mm.

In this embodiment, in closed configuration, the length of the valve is 47 mm and the width is 25 mm, which corresponds to the two arms 36 forming part of a circular ring having a diameter of 25 mm. The width of the two arms 36 is 5.4 mm and the cylinder-shaped sleeve has a diameter of 10 mm. The valve outlet 33 comprises a circular shape.

Figure 5:
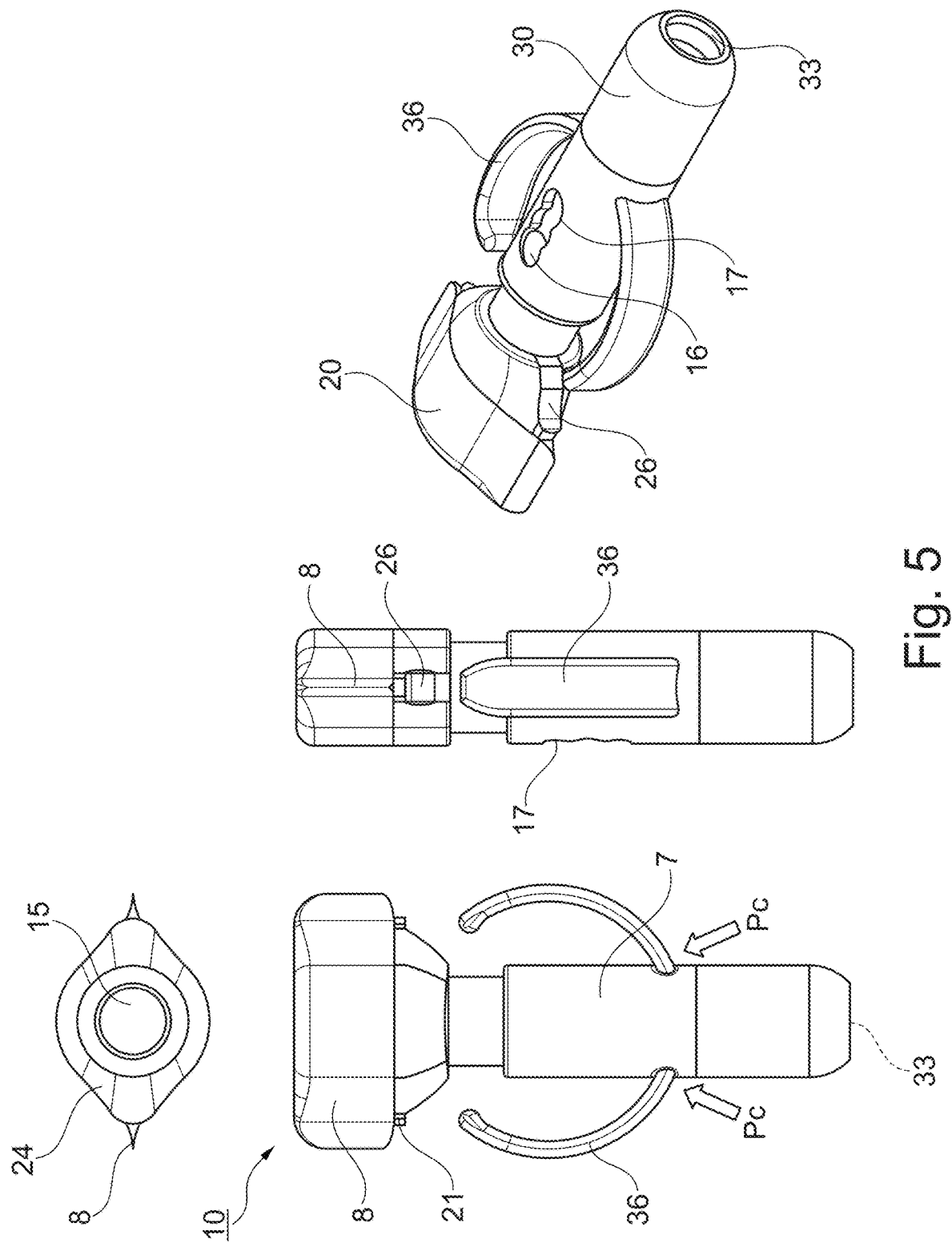
FIG. 5 illustrates a top view, two side views and a perspective view of a valve in an opened configuration.

FIG. 5 illustrates the valve illustrated in FIG. 4, in an opened configuration. FIG. 5 illustrates that the maximum distance between the first and second valve portion 20,30 is 5.2 mm, when the valve is fully opened and the lock protrusion 16 is located in the proximal end of the elongated toothed slit 17.

Figure 6:
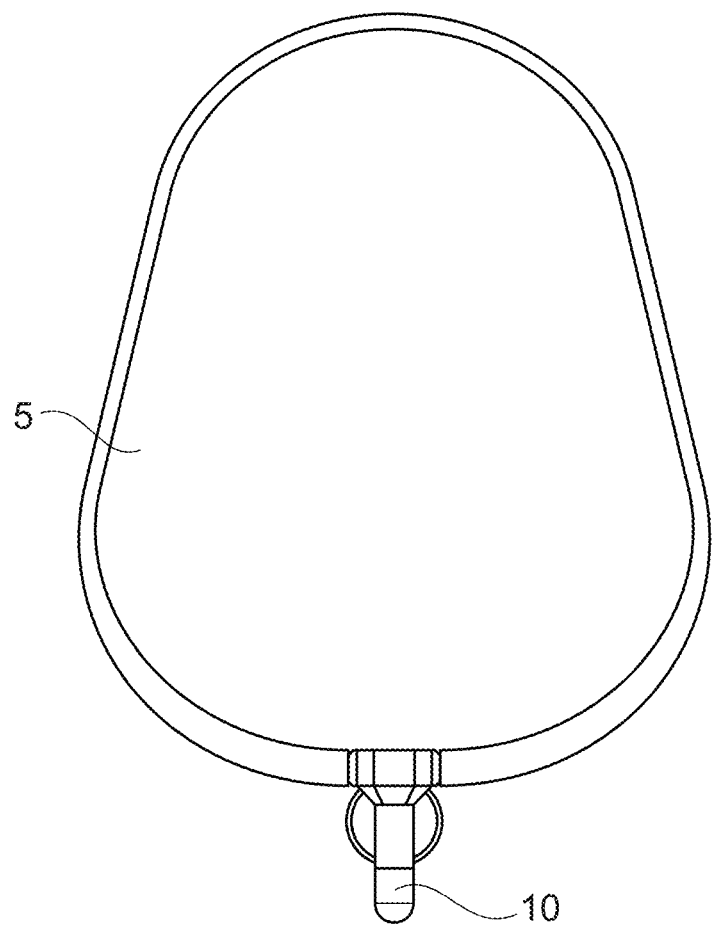
FIG. 6 illustrates a front view of a urostomy collecting pouch and a valve.

FIG. 6 illustrates a front view of a urostomy collecting pouch and a valve having a total length of 38 mm in longitudinal direction.

The invention claimed is:

1. A valve for draining fluid from a urostomy pouch, the valve comprising:
a first valve portion comprising a head portion, a stem, an inlet, a first bore, at least one outlet opening and a distal end closure,
a second valve portion comprising a sleeve, a second bore and a valve outlet,
wherein the first bore and the second bore form a channel to transport fluid from the inlet to the valve outlet,
wherein the sleeve encircles the stem and is adapted to close the channel to prevent drainage of fluid,
wherein the distal end closure of the first valve portion is adapted to close off the valve outlet of the second valve portion, wherein the valve comprises one or more arms, the one or more arms extending between a distal end and a proximal end, the one or more arms having the distal end connected to the sleeve and the proximal end coupled to the head portion, wherein the one or more arms are disposed a distance from the sleeve forming a gap between the one or more arms and the sleeve, wherein the one or more arms are adapted to be moved towards the sleeve into the gap, which displaces the sleeve away from the head portion of the first valve portion to open the channel and allow drainage of fluid through the valve, as the distal end closure is simultaneously displaced into the second bore.

2. The valve according to claim 1, wherein the proximal end of the one or more arms is removably coupled to the head portion.

3. The valve according to claim 1, wherein the head portion comprises one or more contact faces and the proximal end of the one or more arms extends towards the one or more contact faces, the one or more arms and the one or more contact faces being adapted to cooperate when the arms are moved towards the sleeve into the gap to displace the sleeve away from the head portion.

4. The valve according to claim 1, wherein the second valve portion comprises two oppositely positioned arms.

5. The valve according to claim 1, wherein the first valve portion comprises a tapered contact face.

6. The valve according to claim 1, wherein the one or more arms are curved.

7. The valve according to claim 1, wherein the one or more arms are resilient, such that the one or more arms are adapted to be squeezed by finger force of a user allowing the one or more arms to be stretched longitudinally and flex back to shape after end of squeezing.

8. The valve according to claim 1, wherein the one or more contact faces each has a tapered surface tapering in a distal direction.

9. The valve according to claim 1, wherein the two arms are arranged symmetrically along the central longitudinal axis (L).

10. The valve according to claim 1, wherein the one or more arms comprises a semi-circular ring shape having a diameter of 15-35 mm when in an un-squeezed configuration.

11. The valve according to claim 1, wherein the distal end closure of the first valve comprises a cylindrical shape forming a stem plug for a circular shaped valve outlet.

12. The valve according to claim 1, wherein the first valve portion comprises a lock protrusion extending in a radial direction.

13. The valve according to claim 12, wherein the lock protrusion has a distal face comprising a half-moon-shaped face.

14. The valve according to claim 12, wherein the second valve portion comprises an elongated slot extending in the longitudinal direction, the elongated slot being adapted for accommodating the lock protrusion.

15. The valve according to claim 14, wherein the elongated slot comprises toothed sidewalls for providing a holding force for the lock protrusion to be positioned in different positions along the elongated slot.

16. The valve according to claim 1, wherein the valve has a maximum displacement in a longitudinal direction between the head portion and the sleeve in a range of 4-10 mm.

* * * * *